United States Patent [19]

Bjors

[11] 4,055,385
[45] Oct. 25, 1977

[54] WORK PIECE CLAMP ARRANGEMENTS

[76] Inventor: Nils G. Bjors, 161 Crestview St., Barrington, Ill. 60010

[21] Appl. No.: 632,319

[22] Filed: Nov. 17, 1975

[51] Int. Cl.² .......................................... F16B 35/00
[52] U.S. Cl. .................................. 85/1 SS; 403/362; 403/114; 299/93
[58] Field of Search ................ 85/1 SS; 403/362, 114, 403/115, 122, 123; 29/96; 269/249, 258, 259, 261, 262, 246; 299/93; 248/181, 182, 188.9, 188.3, 188.4

[56] References Cited
U.S. PATENT DOCUMENTS

| 334,055 | 1/1886 | Shaw | 269/261 |
|---|---|---|---|
| 1,077,052 | 10/1913 | Dodds | 403/114 X |
| 1,346,867 | 7/1920 | Weibull | 85/1 SS |
| 1,523,932 | 1/1925 | Davies | 85/1 SS |
| 2,649,123 | 8/1953 | Gulland | 269/261 |

FOREIGN PATENT DOCUMENTS

| 890,255 | 2/1962 | United Kingdom | 403/115 |
|---|---|---|---|
| 743,140 | 1/1956 | United Kingdom | 85/1 SS |
| 689,906 | 4/1953 | United Kingdom | 85/1 SS |

Primary Examiner—Andrew V. Kundrat
Attorney, Agent, or Firm—Alter and Weiss

[57] ABSTRACT

An improved ball clamp wherein a socket is provided at the end of a threaded member for receiving a truncated sphere. The degree of movement of the sphere within the socket is controlled to facilitate the use of the ball clamp.

6 Claims, 5 Drawing Figures

U.S. Patent
Oct 25, 1977
4,055,385
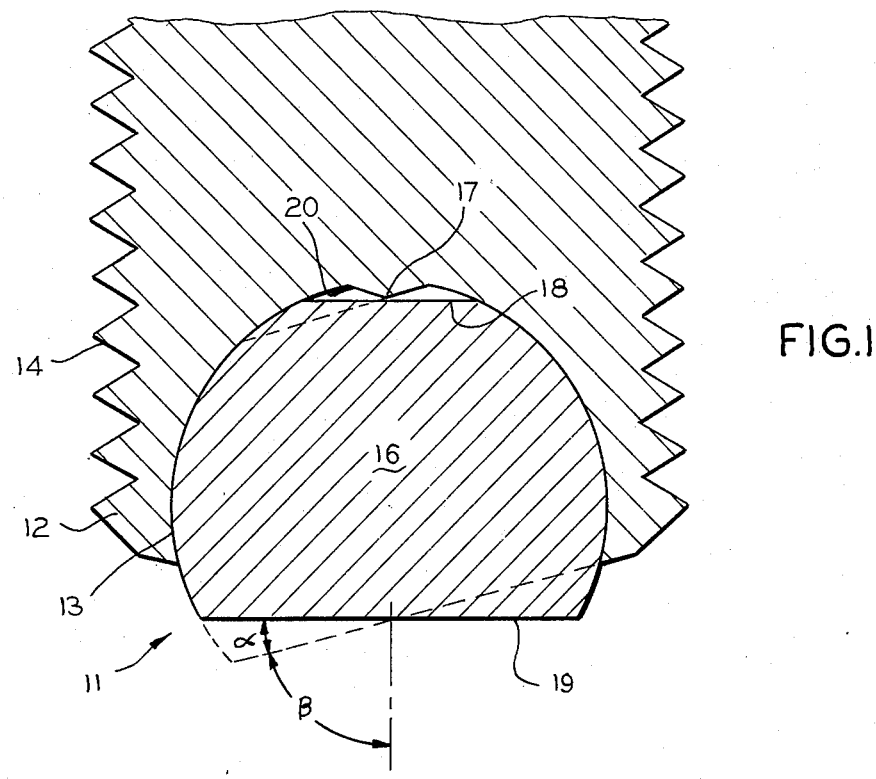
FIG.1
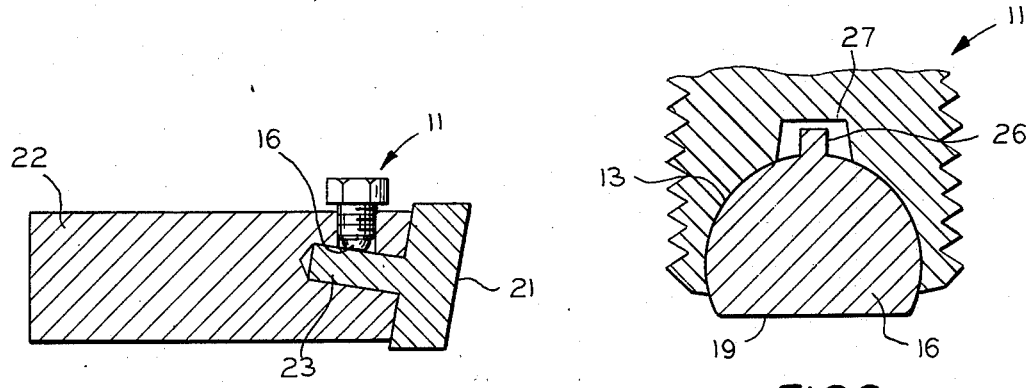
FIG.2
FIG.3
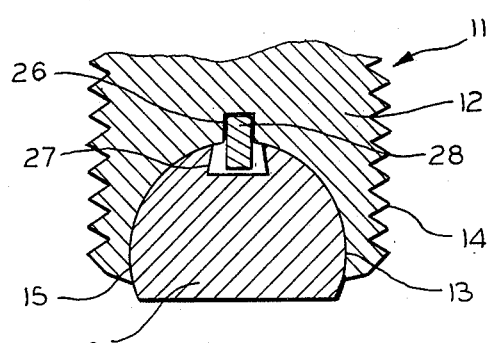
FIG.5
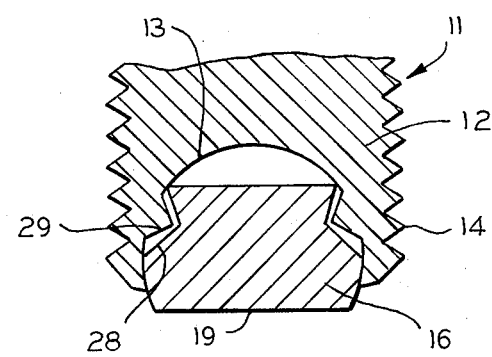
FIG.4

WORK PIECE CLAMP ARRANGEMENTS

This invention relates generally to work piece holders, and more particularly, to improved clamping arrangements used in conjunction with clamping screws.

Prior art work piece holders were equipped with tiltable work engaging elements (See for example, U.S. Pat. No. 2,649,123) The tiltable element cooperated with a clamp shoe to extend the clamping forces to surfaces having diversified angles. The clamp shoe was threaded and locked onto the clamp screw so that turning the screw in a fixture, for example, tightened or loosened the clamp. The shoe terminated in a spheroidal element. The tiltable element had a spherical socket spun around the screw end of the spheroid to lock the tiltable element in place while still enabling the desired tilt. The tilt was naturally limited by the periphery of the spun over portion of the element. Instead of attaching "clamp shoes" to screw elements, work piece holders utilize screw elements that have socket integral thereto. Truncated sphere placed in the sockets serve as the tiltable work engaging elements. These ball clamps are less expensive to manufacture and more efficient to use than the prior art holders, such as are disclosed in U.S. Pat. No. 2,649,123.

A problem with these ball clamps is that the ball is totally free to rotate within the socket. Often the truncated portion of the sphere, which is the work engaging surface, may rotate leaving an arcuate surface to engage the work piece. The arcuate surface is most likely to move the work piece than the flat surface.

Another problem caused by the freely rotating truncated sphere is that it may enable the sphere to work loose and fall from the socket. The benefit of the tool holding ball clamp is that no impressions or marks are made on the tool shanks or other work pieces being held. If a portion of the flat is within the socket, then the rim of the socket will leave a mark. Thus, cancelling the benefit of the ball clamp.

Another problem resulting from a freely rotating ball within a socket is that when the ball or truncated sphere rotates so that the angle between the surface being held and the longitudinal axis of the screw is less than approximately 75°, the clamp tends to cause transverse forces to be applied to screw body.

Accordingly, an object of the present invention is to provide new and improved work piece clamps using a socketed screw member with a truncated work piece engaging ball or sphere held within the socket.

A related object of the present invention is to provide improved ball clamps wherein the sphere is truncated to provide parallel flat surfaces. One flat surface is used as the work pieces engaging surface. A protrusion in the socket cooperates with the other flat surface on the sphere within the socket to limit the rotation of the sphere about an axis normal to the longitudinal axis of the screw member and not limiting the rotation of the sphere about the said longitudinal axis. Thus, the sphere is allowed to rotate about the longitudinal axis without limitation and is allowed to rotate about the axis normal to the longitudinal axis, but within limits.

Yet another object of the present invention is to provide protrusion means on the inner pole of the truncated sphere having a single flat surface. Depression means at the pole of the socket receives the protrusion and limits the rotation of the truncated sphere within the socket.

Yet another object of the present invention is to provide improved ball clamps wherein the truncated sphere as a protrusion and the socket has a receptacle for the protrusion to limit the rotation of the sphere within the socket.

A preferred embodiment of the invention comprises a threaded member having a socket at one end. A sphere which is truncated past its equator so that it's larger than a hemisphere is locked within the socket by spinning the outer periphery of the socket. The first truncated section provides a flat surface for engaging the work piece being clamped. A polar portion of the sphere juxtaposed to the inner-most section of the socket is also truncated providing a second flat surface that is substantially parallel to the bottom of the external-most portion of the truncated sphere. A protrusion in the socket limits the rotation of the sphere within the socket to approximately 15° in any direction.

The above mentioned and other objects and features of the invention will become more apparent from the description of the apparatus in the following specification, taken in conjunction with the accompanying drawings, in which:

FIG. 1 is a sectional view of the ball clamp wherein the rotation of the ball used is limited;

FIG. 2 is a sectional view of the ball clamp showing the ball clamp of FIG. 1 used to clamp a work piece; and FIGS. 3, 4 and 5 are additional embodiments of the inventive ball clamp.

In FIG. 1 the improved ball clamp assembly is generally shown at 11. The sectional view shows the threaded screw member 12 having a socket 13 and threads 14. The screw member could be a stud or a machine screw used in clamping or holding tool parts in place. In addition set screw devices could use the ball and socket arrangement featured herein.

The spheroid or ball 16 is shown set into the socket. It has a portion thereof truncated from the body, however. The remaining truncated sphere is larger than a hemisphere. The socket 13 has a protrusion 17 shown at the polar portion or in this case the bottom-most portion of the socket. At the inner pole of the ball, as shown in FIG. 1, is a second truncated section 18. The protrusion 17 is abutted by truncated section 18, when the ball rotates in any direction. The degree of rotation, therefore, is controlled by the size of the protrusion and angular displacement from the vertical of the sides of the protrusion, such as side 20. Practically, the degree of rotation is limited to approximately 15°.

FIG. 2 shows the application of the ball clamp in holding an angular cutting blade having an angular incline in place within a tool holder. The ball 16 rotates to assume a position wherein the flat section 19 of the major truncated portion of the spheroid abuts the tool 21 holding the tool firmly within the tool holder 22. Tightening the clamp screw 11 depresses the relatively large surface area 19 of the hardened ball against the shank 23 of tool 21. The large surface area minimizes marring of the shank surface, but nonetheless, retains the tool in place.

The flat surface 19 also gives a more reliable setting and is more resistant to the vibratory forces often encountered during the cutting operation with the tools.

FIG. 3 is another embodiment of the invention. The ball clamp is again shown by the number 11, and the ball itself is 16. The truncated surface is 19 and the socket is 13. Instead of a second truncated surface, at the polar section of the sphere, a protrusion 26 is shown at the polar section of the truncated sphere. The protrusion, it should be understood, can be at any other section of the sphere. The socket has an extended depressed portion 27 for receiving protrusion 26. There is sufficient clearance on the depression 27 to enable the protrusion 26 to move so that the flat surface 19 of the ball can vary in positional setting by a desired amount, such as approximately 15° in any direction.

In FIG. 4 yet another embodiment of the invention is shown wherein the tool clamp 11 has a screw member 12, having threads 14 and socket 13 for receiving a truncated sphere 16. A portion of the other surface of the truncated sphere within the socket 13 has a circumferential cavity therein 28. A corresponding portion of the socket has a circumferential protrusion 29 juxtaposed to the cavity and inserted within the cavity. There is sufficient clearance within the cavity 28 to enable the sphere 16 to rotate within the socket, but to be limited in that rotation to a desired amount, such as approximately 15° in any direction.

With this type of arrangement the sphere can be a hemisphere or even less than a hemisphere, enabling the maximization of surface 19. Further, no spinning is required at the bottom of the body 12. The oppositely disposed protrusion and cavity can both be located at specific points instead of being circumferential.

In FIG. 5 still another embodiment of the invention is shown wherein the tool clamp 1 has a screw member 12 having threads 14 and socket for receiving a truncated sphere 16. The sphere is retained in the socket 13 by any well known manner, such as by spinning a retaining shoulder 15 below the equator of the sphere.

Means are provided for limiting the rotation of the sphere 16 in the socket 13. More particularly, there is shown in FIG. 5 a pin receiving aperture 26 in the socket of screw 12 and a slightly larger pin receiving aperture 27 in the body of the sphere. A pin 28 is provided which extends into each of the apertures thereby limiting the rotational movement of the sphere in the socket.

The 15° rotation, previously alluded to herein, is shown as angle α in FIG. 1. 75° rotation, previously alluded to, is the complementary angle β, also shown in FIG. 1. The truncated portion 19 abuts the surface of the workpiece. Where necessary, the ball 16 is rotated within the socket 15° to accomplish this.

It should be understood that while the ball and socket arrangement have been described in conjunction with a screw clamping device; nonetheless, it is believed that this invention also applies to other types of retaining devices, such as tubular members, plate members and the like, used not only for clamping, but also for functions, such as leveling pads, toggle pads, or the like.

While the principles of the invention have been described above in connection with specific apparatus and applications, it is to be understood that this description is made only by way of example, and not as a limitation on the scope of the invention.

I claim:

1. A clamping screw device for clamping work pieces, said device comprising a screw body, exterior threads on said screw body, a socket on one end of said screw body, sphere means located within said socket, the opening to said socket being smaller than the diameter of the sphere means, whereby said sphere is retained in said socket,
   a first flat surface on one side of said sphere means,
   said first flat surface located outside of said socket for use in abutting said work pieces,
   limiting means for limiting the rotation of said sphere within said socket,
   said limiting means including substantially conical protrusion means on the wall of the socket,
   said limiting means further including a cooperating surface on the portions of said sphere within said socket, and
   said protrusion centrally located in said cooperating surface when said first flat surface is normal to the longitudinal axis of said clamping screw device.

2. The clamping screw device of claim 1 wherein most of the surface of said sphere within said socket abuts the surface of said socket.

3. The clamping screw device of claim 1 wherein said cooperating surface comprises a second flat surface.

4. The clamping screw device of claim 1 wherein said cooperating surface comprises a substantially conical indentation.

5. A clamping screw device for holding work pieces, said device comprising a screw body,
   threads on said screw body,
   a socket in one end of said screw body,
   truncated sphere means located within said socket,
   a first flat surface on one side of said truncated sphere,
   said first flat surface located outside of said socket for use in abutting said work pieces,
   a second flat surface located on the portion of said sphere within said socket,
   said second flat surface being parallel to said first flat surface,
   limiting means including said second flat surface for limiting the rotation of said sphere within said socket,
   said limiting means further including substantially conical protrusion means on the wall of the socket for abutting said second flat surface at the center thereof, and wherein the angle of the walls of said conical protrusion means limits the angular rotation of said sphere in all directions.

6. The clamping screw device of claim 5 wherein said angular limitation is substantially 15°.

* * * * *